US012724395B2

(12) United States Patent
Shinagawa et al.

(10) Patent No.: US 12,724,395 B2
(45) Date of Patent: Sep. 1, 2026

(54) RADIO FREQUENCY SENSOR CALIBRATION BY VIRTUAL METROLOGY

(71) Applicant: Tokyo Electron Limited, Tokyo (JP)

(72) Inventors: Jun Shinagawa, Fremont, CA (US); Barton Lane, Austin, TX (US); Merritt Funk, Austin, TX (US); Shinichi Kozuka, Hillsboro, OR (US); Masashi Kanda, Hillsboro, OR (US)

(73) Assignee: Tokyo Electron Limited, Tokyo (JP)

( * ) Notice: Subject to any disclaimer, the term of this patent is extended or adjusted under 35 U.S.C. 154(b) by 353 days.

(21) Appl. No.: 18/589,541

(22) Filed: Feb. 28, 2024

(65) Prior Publication Data

US 2025/0271830 A1 Aug. 28, 2025

(51) Int. Cl.
*G05B 19/18* (2006.01)

(52) U.S. Cl.
CPC .. *G05B 19/188* (2013.01); *G05B 2219/45031* (2013.01)

(58) Field of Classification Search
CPC .................... G05B 19/188; G05B 2219/45031
See application file for complete search history.

(56) References Cited

U.S. PATENT DOCUMENTS

2011/0174777 A1 7/2011 Jensen et al.
2012/0203495 A1 8/2012 Sun et al.
2012/0318966 A1 12/2012 Jensen et al.
2014/0107824 A1 4/2014 Zhu et al.
2014/0355643 A1 12/2014 Sharratt et al.
2018/0274086 A1 9/2018 Honda et al.
2020/0051787 A1* 2/2020 Shinagawa ....... H01J 37/32183
2020/0333774 A1* 10/2020 Banna .............. G05B 19/41875
2021/0050191 A1 2/2021 Usami et al.
2021/0313152 A1* 10/2021 Luo .................. H01J 37/32174
2021/0407771 A1 12/2021 Funk et al.
2022/0057482 A1 2/2022 Fritzin et al.

(Continued)

FOREIGN PATENT DOCUMENTS

JP 2015-29093 A 2/2015
KR 10-2024-0001593 A 1/2024

OTHER PUBLICATIONS

International Search Report and Written Opinion of the International Searching Authority issued Apr. 29, 2025 in PCT/US2025/010772, 8 pages.

*Primary Examiner* — Rami R Okasha
(74) *Attorney, Agent, or Firm* — Oblon, McClelland, Maier & Neustadt, L.L.P.

(57) ABSTRACT

A method of chamber matching is provided. A first virtual metrology (VM) model is configured to predict a first thickness change rate (TCR) for executing a plasma recipe in a first chamber. A second VM model is configured to predict a second TCR for executing the plasma recipe in a second chamber. The plasma recipe includes one or more inert gases and no reactive gases. A control model describes relationships between voltage, current and recipe parameters. In reference to a first voltage in the first chamber measured by a first radio frequency (RF) sensor, a second voltage in the second chamber measured by a second RF sensor is calibrated. In reference to a first current in the first chamber measured by the first RF sensor, a second current in the second chamber measured by the second RF sensor is calibrated.

20 Claims, 6 Drawing Sheets

(56) References Cited

U.S. PATENT DOCUMENTS

| | | | | |
|---|---|---|---|---|
| 2022/0092242 | A1 | 3/2022 | Shinagawa et al. | |
| 2022/0207223 | A1 | 6/2022 | Das | |
| 2022/0406580 | A1 | 12/2022 | Shinagawa et al. | |
| 2023/0082359 | A1 * | 3/2023 | Bhutta ............. | H01J 37/32183<br>333/17.3 |
| 2024/0203711 | A1 * | 6/2024 | Kapoor ............ | H01J 37/32183 |
| 2025/0379034 | A1 * | 12/2025 | Valcore ............ | H01J 37/32174 |

* cited by examiner

RADIO FREQUENCY SENSOR CALIBRATION BY VIRTUAL METROLOGY

INCORPORATION BY REFERENCE

Aspects of the present disclosure are related to U.S. patent application Ser. No. 17/025,651 filed on Sep. 18, 2020 titled “VIRTUAL METROLOGY FOR WAFER RESULT PREDICTION”, U.S. patent application Ser. No. 17/710,362 filed on Mar. 31, 2022 titled “VIRTUAL METROLOGY MODEL BASED SEASONING OPTIMIZATION”, U.S. patent application Ser. No. 17/730,751 filed on Apr. 27, 2022 titled “AUTONOMOUS OPERATION OF PLASMA PROCESSING TOOL”, U.S. Pat. Nos. 10,916,411, 11,669,079 and 11,869,756, all of which are incorporated herein by reference in their entirety.

FIELD OF THE INVENTION

This disclosure relates generally to methods of microfabrication and more specifically to sensor calibration.

BACKGROUND

In the manufacture of a semiconductor device (especially on the microscopic scale), various fabrication processes are executed such as film-forming depositions, etch mask creation, patterning, material etching and removal, and doping treatments. These processes are performed repeatedly to form desired semiconductor device elements on a substrate. To meet the physical and electrical specifications of current and next-generation semiconductor devices, process flows are required to reduce feature size while maintaining structure integrity for various patterning processes.

SUMMARY

The present disclosure relates to a method of chamber matching and an apparatus for executing the same.

According to a first aspect of the disclosure, a method of chamber matching is provided. The method includes providing a first virtual metrology (VM) model that is configured to predict a first thickness change rate (TCR) for executing a plasma recipe in a first chamber. A second VM model that is configured to predict a second TCR for executing the plasma recipe in a second chamber is provided. The plasma recipe includes one or more inert gases and no reactive gases. A control model that describes relationships between voltage, current and recipe parameters is provided. In reference to a first voltage in the first chamber measured by a first radio frequency (RF) sensor, a second voltage in the second chamber measured by a second RF sensor is calibrated using a golden reference sensor. In reference to a first current in the first chamber measured by the first RF sensor, a second current in the second chamber measured by the second RF sensor is calibrated, using the first TCR, the second TCR, the first VM model, the second VM model and the control model.

In some embodiments, the first voltage and the second voltage are set to a fixed value. The plasma recipe is executed in the first chamber and the second chamber with varying current while maintaining the first voltage and the second voltage at the fixed value. TCR data and voltage and current (V-I) data are collected for the varying current.

In some embodiments, based on the control model, changes in the recipe parameters are determined which are needed to vary the current while maintaining the first voltage and the second voltage at the fixed value. The recipe parameters are adjusted based on the changes determined.

In some embodiments, the V-I data are processed at least in part based on a linear or non-linear equation.

In some embodiments, a linear equation of the second current versus the first current is obtained using the first TCR, the second TCR, the first VM model and the second VM model. The V-I data are fitted with the linear equation.

In some embodiments, the linear equation has a slope of zero.

In some embodiments, the first voltage equal is set to the second voltage. A difference between the first TCR and the second TCR is determined. The second current is adjusted based on the control model, while maintaining the first voltage equal to the second voltage, so that the first TCR and the second TCR are substantially the same.

In some embodiments, based on the control model, changes in the recipe parameters are determined which are needed to substantially offset the difference between the first TCR and the second TCR by varying the second current while maintaining the first voltage equal to the second voltage. The recipe parameters are adjusted based on the changes determined.

In some embodiments, the difference between the first TCR and the second TCR is calculated based on the second voltage calibrated, the second current calibrated, the first VM model and the second VM model.

In some embodiments, the first TCR and the second TCR are both etch rates or both sputter rates.

In some embodiments, the first TCR and the second TCR are sputter rates on blanket films.

In some embodiments, the plasma recipe includes a plasma etching recipe.

In some embodiments, the first RF sensor and the second RF sensor include voltage peak-to-peak (VPP) sensors.

In some embodiments, the first voltage and the second voltage are each an on-wafer voltage at a respective wafer surface.

In some embodiments, the plasma recipe is executed in the first chamber and the second chamber. voltage and current (V-I) data are measured with the first RF sensor and the second RF sensor while executing the plasma recipe. TCR data are measured before and after executing the plasma recipe.

In some embodiments, the first VM model and the second VM model are built using the V-I data and the TCR data.

In some embodiments, the recipe parameters are determined using design of experiment (DOE). The control model is built using the V-I data, the TCR data and the recipe parameters.

In some embodiments, calibrating the second voltage includes forming a baseline plasma in the first chamber at least in part based on one or more baseline process conditions implemented by the first chamber. A baseline signature of the baseline plasma is determined using the golden reference sensor disposed within the first chamber and one or more baseline plasma sensors monitoring the baseline plasma. Plasma is formed in a second chamber at least in part based on the baseline process conditions used to form the baseline plasma. A signature of the plasma is determined using the golden reference sensor disposed within the second chamber and one or more plasma sensors monitoring the plasma. Differences between the baseline signature and the signature are determined at least in part based on linear or non-linear equations that are representative of the base-line signature and the signature. A display value of the second voltage is adjusted at least in part based on the differences between the baseline signature and the signature, to compensate for the differences to provide voltage matching between the second chamber and the first chamber.

In some embodiments, the golden reference sensor includes a plasma voltage sensor.

According to a second aspect of the disclosure, an apparatus is provided. The apparatus includes a controller including a processor that is programmed to provide a first virtual metrology (VM) model that is configured to predict a first thickness change rate (TCR) for executing a plasma recipe in a first chamber. A second VM model that is configured to predict a second TCR for executing the plasma recipe in a second chamber is provided. The plasma recipe includes one or more inert gases and no reactive gases. A control model that describes relationships between voltage, current and recipe parameters is provided. In reference to a first voltage in the first chamber measured by a first radio frequency (RF) sensor, a second voltage in the second chamber measured by a second RF sensor is calibrated using a golden reference sensor. In reference to a first current in the first chamber measured by the first RF sensor, a second current in the second chamber measured by the second RF sensor is calibrated, using the first TCR, the second TCR, the first VM model, the second VM model and the control model.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1:
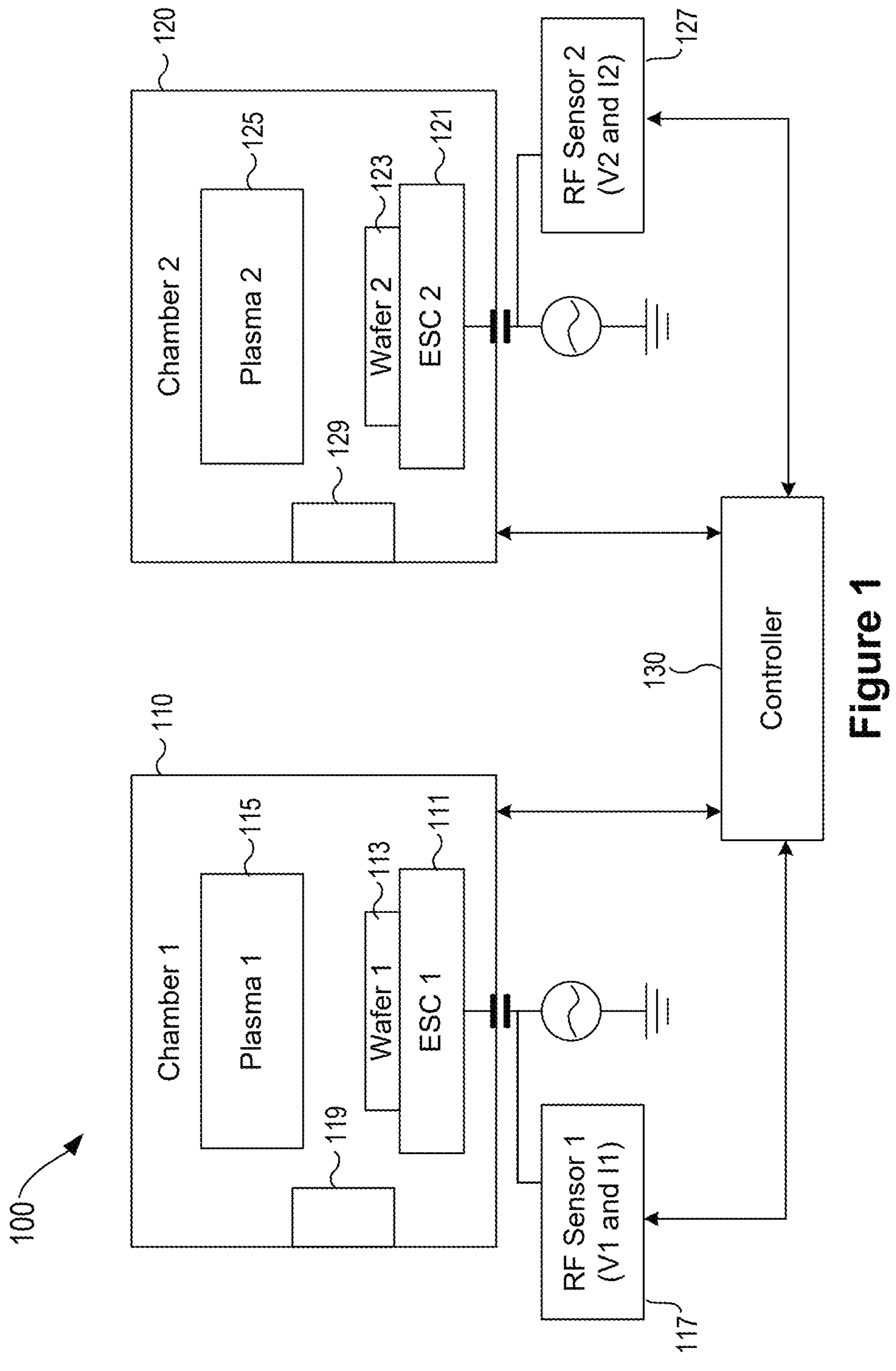
FIG. 1 shows a schematic of a system for chamber matching in accordance with one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity's sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In the drawings, like reference numerals designate identical or corresponding parts throughout the several views. Additionally, as used herein, the words "a", "an" and the like generally carry a meaning of "one or more", unless stated otherwise.

Furthermore, the terms, "approximately", "approximate", "about", "substantially" and similar terms generally refer to ranges that include the identified value within a margin of 20%, 10%, or preferably 5%, and any values therebetween.

Plasma processing systems including plasma processing chambers are used in the manufacture of microelectronic workpieces. For example, a plasma processing chamber may be used to generate plasma or ionized gas(es) at sub-atmospheric conditions using one or more electrodes to apply electrical energy to the gas to initiate the deionization process. Plasma may be used to etch patterns or deposit films in semiconductor substrates to form microelectronic devices across the surface of the substrate. Device performance may be driven by the geometry or profile of the patterns. As such, it is desirable to etch the same pattern in a consistent and predictable way enabling the plasma processing chamber or groups of chambers across the same tool or multiple tools to perform in the same way. In order to provide this consistency, plasma processing chambers are designed to control chamber pressure, gas flow, temperature, applied power such as potential differences from direct current (DC) and/or alternating current (AC) sources applied to electrodes (e.g., transmission sources), and/or other process conditions for the chamber. Maintaining accurate and repeatable control of these process conditions, therefore, is desirable to achieve uniform performance for devices fabricated within substrates processed in different plasma processing chambers or different groups of chambers performing the same or similar processes.

Chamber matching, particularly matching on-wafer plasma parameters across multiple chambers, is critical. High-fidelity matching of on-wafer ion and electron properties across multiple chambers depends on the ability to calibrate radio frequency (RF) sensors used to estimate those parameters. Chamber-to-chamber variability of RF sensor measurements may arise from variations in impedance of RF paths and RF sensors themselves. RF sensor products have failed in the past due to inability to match RF sensors installed in multiple chambers.

Performance matching across multiple chambers, however, can be difficult and time consuming. For example, achieving chamber matching by referencing plasma sensor values among multiple processing chambers is extremely challenging because of measurement errors arising from variabilities in sensor assembly parts and/or other sources. Variabilities can include, for example, window conditions for optical emission spectrometry (OES) sensors, impedances for radio frequency (RF) voltage sensors, impedance mismatches between sensors, and/or other sensor-related variabilities. Measurement errors caused by these variabilities reduce the accuracy of sensor measurements and cause discrepancies among different sensors. As such, improvements to reduce the cost, time, and quality of the sensor and chamber matching is desirable.

In prior solutions, chamber matching is typically implemented by matching direct metrology measurements on patterned test wafers. For example, direct metrology measurements are made for product parameters such as critical dimension (CD) or etch rate (ER) for a plasma process performed within the chambers. While these metrology-based matching techniques can achieve good matching for specific structural dimensions on patterned test wafers, these metrology-based matching techniques typically do not provide matching of plasma related parameters or other non-measured structural dimensions, thereby resulting in mismatching of device performance. For example, variations in processes used to fabricate production wafers may induce unnoticed variations on structures that are not directly measured. These unnoticed variations can lead to degradation in the yield and performance of production runs.

Techniques herein can combine on-wafer sensor measurement and sputter rate to circumvent limitations set by availabilities of on-wafer sensors. The disclosed embodiments provide RF sensor matching across different chambers by adjusting sensor values based upon virtual metrology, sputter rate and a control model. These adjustments help ensure different chambers across the same or similar processing equipment will control plasma processes in the same or similar way. As such, these adjustments help decrease or minimize device performance differences for devices manufactured in different processing chambers.

According to aspects of the present disclosure, calibration methodology can include thin film blanket wafer sputter rate to provide data to calibrate current measurement along with on-wafer voltage and RF sensor measurements. Yields of thin film blanket wafer sputter rate are modeled by VM technology with voltage and current values, which is utilized to calibrate current measurement.

Techniques herein provide a method of sensor matching across different chambers. Voltage (V) calibration can be executed, for example using a golden reference sensor as disclosed in U.S. Pat. No. 10,916,411, which is incorporated herein by reference in its entirety. Current (I) calibration can then be executed using virtual metrology (VM) models that are configured to predict sputter rate and a control model that is configured to describe relationships between V, I and recipe parameters. As a result, sensors in one chamber can be calibrated in reference to sensors in another chamber.

Techniques herein provide a method of performance matching across different chambers. After voltage calibration and current calibration are complete, chamber performance, such as sputter rate, can be matched across different chambers by calculating the difference in sputter rate and adjusting the current based on the control model. Therefore, two or more chambers can have the same or similar sputter rate, thus minimizing device variation across different processing chambers and improving device performance consistency and reliability.

FIG. 1 shows a schematic of a system 100 for chamber matching in accordance with one embodiment of the present disclosure. As shown, the system 100 includes a plurality of plasma processing chambers, such as a first chamber 110 and a second chamber 120, which can be part of a single plasma processing tool or belong to multiple plasma processing tools. In the first chamber 110, a first wafer 113 can be placed on a first electrostatic chuck (ESC) 111. A first plasma 115 is generated and characterized by one or more first plasma sensors 119 and at least one first RF sensor 117. In the second chamber 120, a second wafer 123 can be placed on a second ESC 121. A second plasma 125 is generated and characterized by one or more second plasma sensors 129 and at least one second RF sensor 127.

Note that the first wafer 113 and the second wafer 123 can each be a dummy wafer or a test wafer, instead of a product wafer having patterned structure manufactured thereon. The first wafer 113 and the second wafer 123 can each include one or more blanket films formed thereon.

In a non-limiting example, the first RF sensor 117 and the second RF sensor 127 can each include a bias voltage peak-to-peak (VPP) sensor. VPP can denote the amount of RF voltage present at a surface of a wafer from RF power applied to the electrodes above or below the wafer within the processing chamber. Accordingly, the first RF sensor 117 and the second RF sensor 127 can each be configured to measured voltage and current, particularly on-wafer voltage and on-wafer current at a respective wafer surface. As discussed earlier, chamber-to-chamber variability of RF sensor measurements can arise from variations in impedance of RF paths and RF sensors themselves. Particularly, VPP sensors can have variabilities due to impedance mismatch from part tolerances, installation differences, and/or other variabilities. Note that VPP sensors are used herein merely for illustrative purposes and are not limiting. In other embodiments, the first RF sensor 117 and the second RF sensor 127 can each include other types of RF sensors that are configured to measure temperature, pressure, ion flux, ion density, etc. as known by one skilled in the art.

The first plasma sensors 119 and the second plasma sensors 129 can each include an optical emission spectroscopy (OES) sensor, a VPP sensor, an ion flux sensor, a temperature sensor, a pressure sensor, and other plasma sensors as known by one skilled in the art. When the first RF sensor 117 and the second RF sensor 127 include VPP sensors, the first plasma sensors 119 and the second plasma sensors 129 can also include VPP sensors that are used as golden references sensors, which will be further explained later.

Locations of the first RF sensor 117, the second RF sensor 127, the first plasma sensors 119 and the second plasma sensors 129 are not particularly limited. That is, the first RF sensor 117, the second RF sensor 127, the first plasma sensors 119 and the second plasma sensors 129 can each independently be placed inside or outside a corresponding chamber (e.g. 110 and 120), in contact with, in proximity to, distant from or within a corresponding wafer (e.g. 113 and 123), and the like.

The first plasma 115 and the second plasma 125 can be utilized for various purposes, such as etching, film deposition, cleaning, surface activation and modification, etc. Plasma etching will be used in this disclosure for illustrative purposes and is not limiting.

Further, a controller 130 may optionally be included in the example of FIG. 1. Components of one or more corresponding plasma tools can be connected to and controlled by the controller 130 that may optionally be connected to a corresponding memory storage unit and user interface (all not shown). Various plasma-processing operations can be executed via the user interface, and various plasma processing recipes and operations can be stored in a storage unit. Accordingly, a given wafer can be processed within a plasma chamber with various microfabrication techniques.

The controller 130 may be coupled to various components of the corresponding plasma tool(s) to receive inputs from and provide outputs to the components. For example, the controller 130 can be configured to receive sensor data from the first RF sensor 117, the second RF sensor 127, the first plasma sensors 119 and/or the second plasma sensors 129. The controller 130 can also be configured to adjust knobs and control settings for the corresponding plasma tool(s), or more specifically the first chamber 110 and the second chamber 120. Of course the adjustment(s) can be manually made as well.

The controller 130 can be implemented in a wide variety of manners. In one example, the controller 130 is a computer. In another example, the controller 130 includes one or more programmable integrated circuits that are programmed to provide the functionality described herein. For example, one or more processors (e.g. microprocessor, microcontroller, central processing unit, etc.), programmable logic devices (e.g. complex programmable logic device (CPLD)), field programmable gate array (FPGA), etc.), and/or other programmable integrated circuits can be programmed with software or other programming instructions to implement the functionality of a proscribed plasma process recipe. It is further noted that the software or other programming instructions can be stored in one or more non-transitory computer-readable mediums (e.g. memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein. Other variations could also be implemented.

Figure 2:
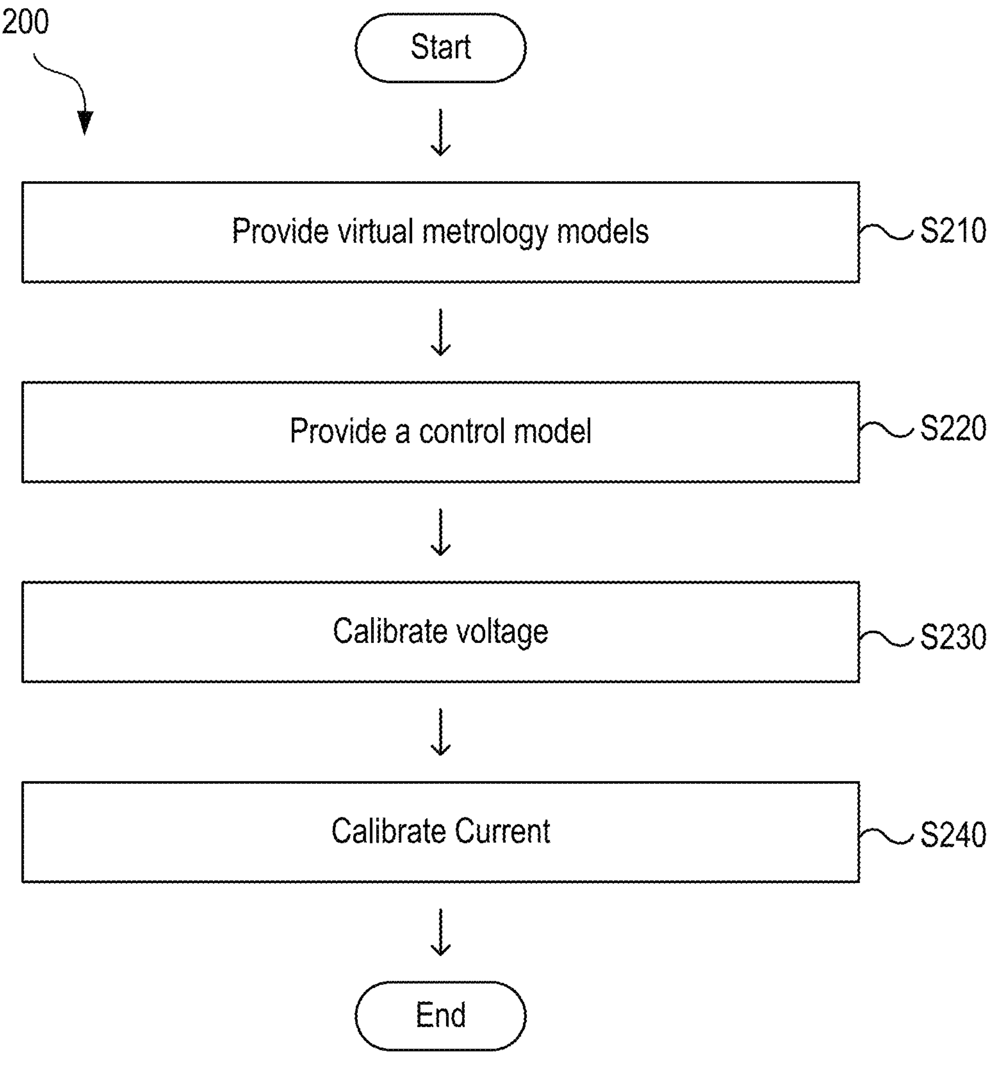
FIG. 2 shows a flow chart of chamber matching, in accordance with some embodiments of the present disclosure.
Figure 3:
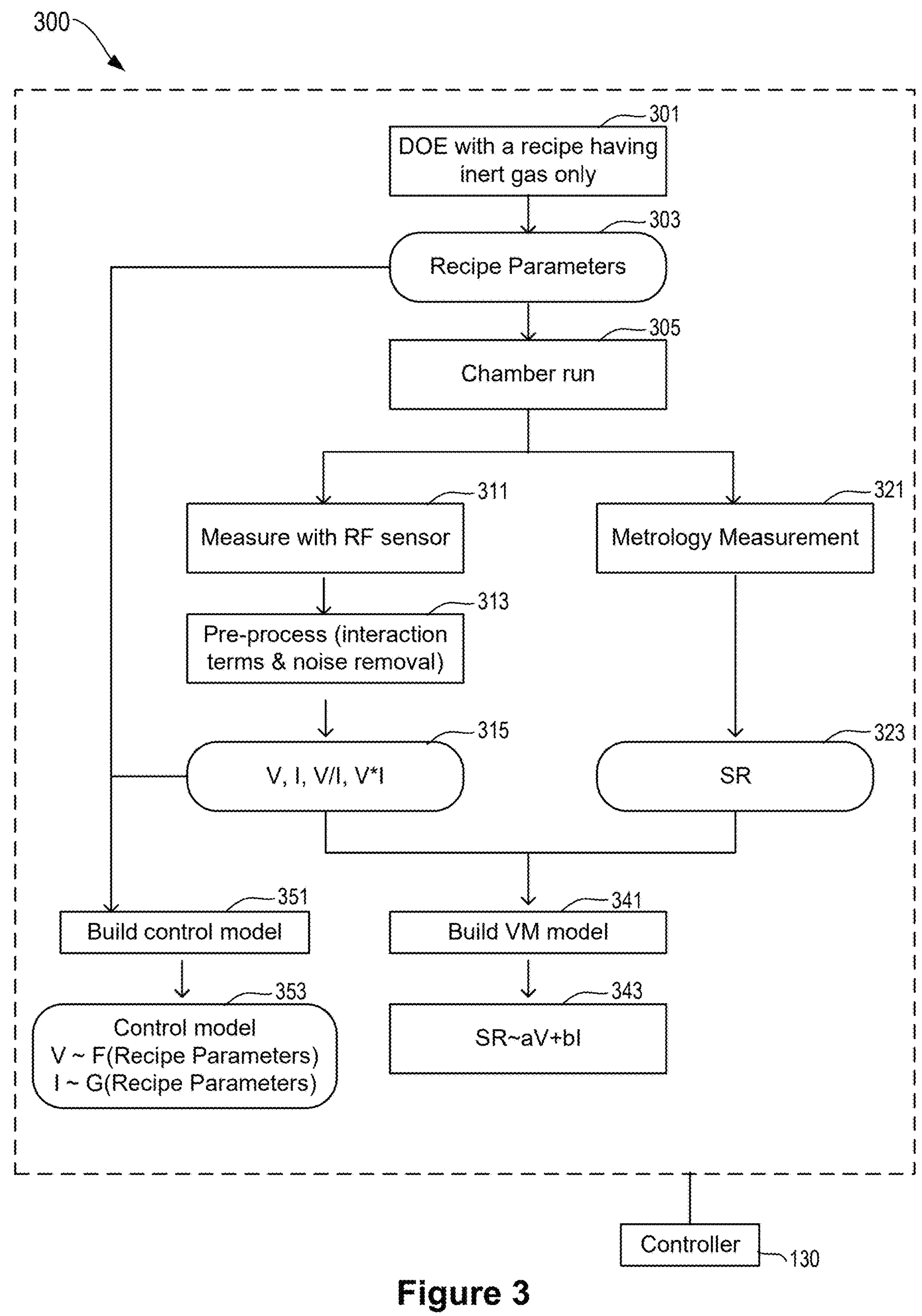
FIG. 3 shows a flow diagram of building a virtual metrology (VM) model and a control model in accordance with one embodiment of the present disclosure.
Figure 5:
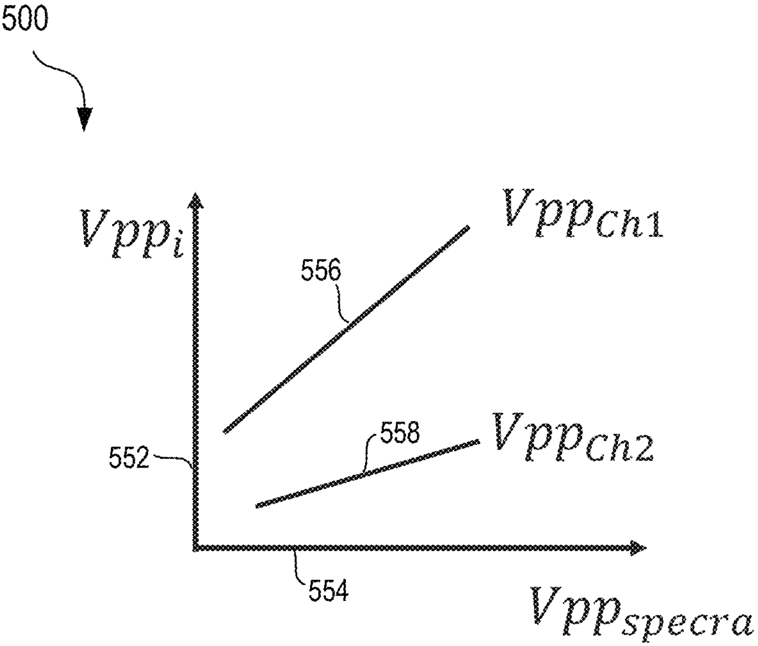
FIG. 5 shows voltage (V) calibration in accordance with one embodiment of the present disclosure.
Figure 6:
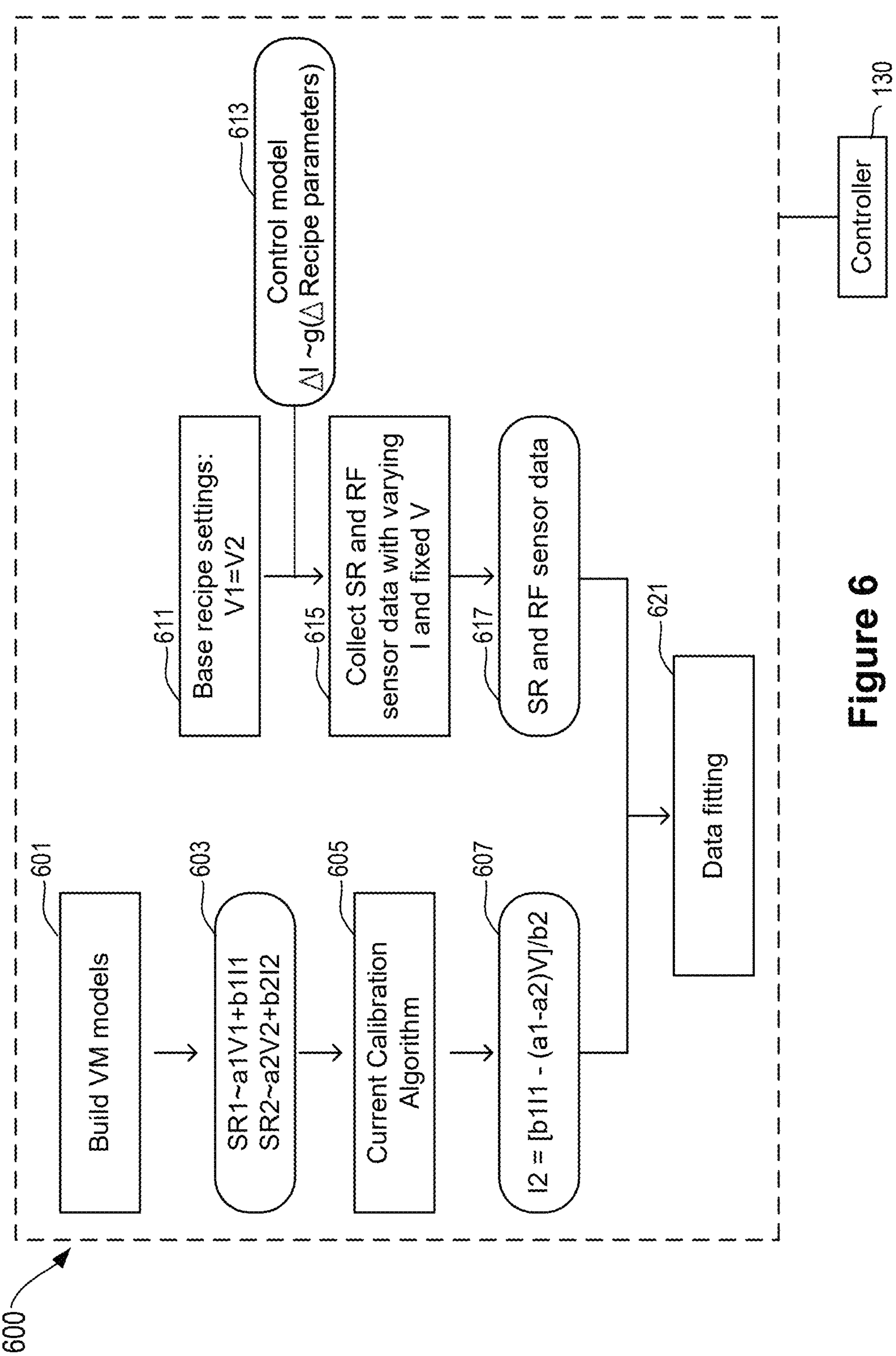
FIG. 6 shows a flow diagram of current (I) calibration in accordance with one embodiment of the present disclosure.

FIG. 2 shows a flow chart of a process 200 of chamber matching, in accordance with some embodiments of the present disclosure. At step S210, virtual metrology (VM) models are provided, e.g. built by oneself or obtained from a third party. At step S220, a control model is provided, e.g. built by oneself or obtained from a third party. FIG. 3 shows one example of building the VM models and the control model. At step S230, voltage is calibrated. FIG. 5 shows one example of voltage calibration. At step S240, current is calibrated. FIG. 6 shows one example of current calibration.

In a non-limiting embodiment, a first virtual metrology (VM) model that is configured to predict a first thickness change rate (TCR) for executing a plasma recipe in a first chamber is provided. A second VM model that is configured to predict a second TCR for executing the plasma recipe in a second chamber is provided. The plasma recipe includes one or more inert gases and no reactive gases. A control model that describes relationships between voltage, current and recipe parameters on recipe parameters is provided. In reference to a first voltage in the first chamber measured by a first radio frequency (RF) sensor, a second voltage in the second chamber measured by a second RF sensor is calibrated using a golden reference sensor. In reference to a first current in the first chamber measured by the first RF sensor, a second current in the second chamber measured by the second RF sensor is calibrated, using the first TCR, the second TCR, the first VM model, the second VM model and the control model.

FIG. 3 shows a flow diagram of a process 300 of building a virtual metrology (VM) model and a control model in accordance with one embodiment of the present disclosure. In block 301, a recipe that only contains one or more inert gases (e.g. Ar, He and the like) is chosen. That is, the recipe contains no reactive gases in order to isolate chemistry component to build etch rate (ER) or sputter rate (SR) model with only ion contribution (e.g. ion flux and ion energy). For example, the recipe can include a plasma etching recipe excluding reactive gases. Design of Experiment (DOE) is executed for the recipe to select or obtain recipe parameters 303.

In block 305, the recipe is run in a plasma processing chamber (e.g. 110 and 120). While the recipe is being executed, voltage and current (V-I) data are collected by at least one RF sensor (e.g. 117 and 127) in block 311. In block 313, the V-I data can be pre-processed to obtain interactions terms (e.g. V/I and V*I) and remove noise. As a result, data related to V, I, V/I and V*I 315 can be obtained.

After the recipe is executed, metrology measurement is executed in block 321 to obtain a post-processing film thickness, in situ by a metrology module integrated with a corresponding plasma tool or ex situ in a separate metrology tool. It should be understood that the same or similar metrology measurement can be executed before the recipe is executed in block 305 to obtain a pre-processing film thickness. As a result, a thickness change rate (TCR) can be derived or obtained when the duration of the recipe is known. In this example, the TCR is a sputter rate 323 calculated by (the pre-processing film thickness−the post-processing film thickness)/the duration of the recipe.

In block 341, a virtual metrology (VM) model is built based on the V-I data (e.g. 315) and SR data (e.g. 323), for example using techniques disclosed in Applicant's co-pending U.S. patent application Ser. No. 17/025,651 filed on Sep. 18, 2020 titled "VIRTUAL METROLOGY FOR WAFER RESULT PREDICTION", which is incorporated herein by reference in its entirety. The VM model can be configured to predict a thickness change rate (TCR) for executing a plasma recipe in a chamber. The VM model may at least partially be based on a linear or non-linear equation. In a non-limiting example of block 343, the VM model is $SR=aV+bI$, where SR is a sputter rate, V is voltage, I is current, and a and b are coefficients.

Figure 4:
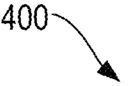
FIG. 4 shows sputter rate (SR) data in accordance with one embodiment of the present disclosure.
Figure 4:
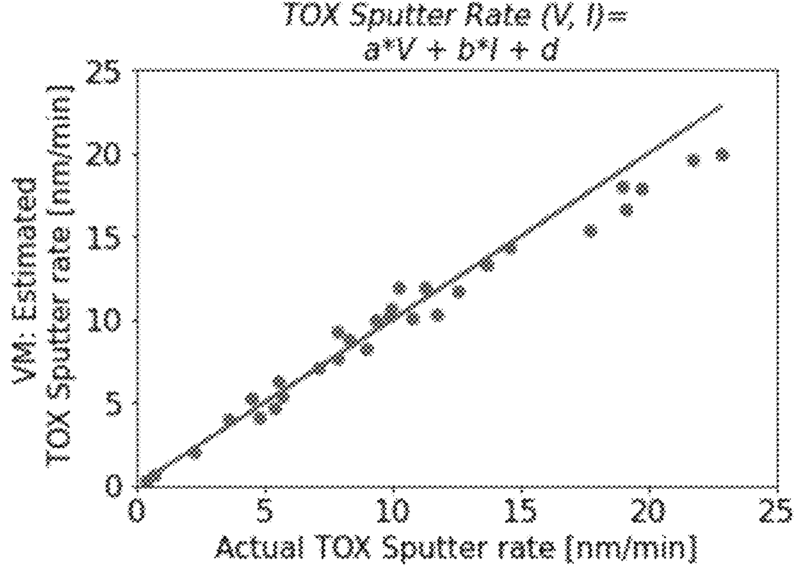

FIG. 4 shows sputter rate (SR) data in accordance with one embodiment of the present disclosure. As shown, sputter rate of gate oxide thickness (TOX) is a function of V and I in the form of $a^*V+b^*I+d$, where V is voltage, I is current, $a^*$ and $b^*$ are coefficients, and d is a constant. Sputter rate of TOX estimated by a virtual metrology (VM) equation and actual sputter rate of TOX obtained by metrology measurement are in good agreement with each other, demonstrating the accuracy of VM. Note that d is approximately zero in this example so the VM equation can be effectively reduced to a*V+b*I, thus the VM model of SR=aV+bI in block 343.

In block 351, a control model 353 is built that describes dependence of voltage and current (V-I) on recipe parameters, based on the V-I data (e.g. 315) and the recipe parameters 303. That is, V and I can each be described as a function of the recipe parameters, e.g. V=F (recipe parameters) and I=G (recipe parameters). As a result, changes in V and I can also be described as functions of changes in the recipe parameters, e.g. ΔV=f(Δ(recipe parameters)) and ΔI=g(Δ(recipe parameters)). In addition, the control model 353 can describe dependence of the recipe parameters on V and/or I as well as dependence of the changes in the recipe parameters on changes in V and/or I.

In some embodiments, the controller 130 may optionally be coupled to various components of the process 300 to receive inputs from and provide outputs to the components. For example, the controller 130 can be configured to receive RF data from block 311 and/or metrology data from block 321. The controller 130 can also be configured to implement measurement in block 311 and/or block 321. The controller 130 can further implement block 305 by executing the recipe. Additionally, the controller 130 can be configured to utilize the RF data and/or the metrology data to build the VM model in block 341 and/or build the control model in block 351. The controller 130 may further be configured to implement DOE in block 301 and receive the recipe parameters 303. Of course, one or more functions of the controller 130 can also be manually accomplished.

At step S230 in FIG. 2, voltage is calibrated, for example based on a graph 500 shown in FIG. 5 using techniques disclosed in U.S. Pat. No. 10,916,411, which is incorporated herein by reference in its entirety. Briefly speaking, the first RF sensor 117, the second RF sensor 127, the first plasma sensors 119 and the second plasma sensors 129 in FIG. 1 can each include a respective VPP sensor. Particularly, VPP sensors of the first plasma sensors 119 and the second plasma sensors 129 can function as a golden reference sensor in the form of a wafer with an embedded VPP sensor and other sensors as explained in U.S. Pat. No. 10,916,411. Alternatively, the golden reference sensor can include a plasma voltage sensor embedded within a wafer.

A vertical axis 552 in the graph 500 represents the magnitude of the VPP data ($VPP_i$) collected by the VPP sensors over the process run. A line 556 represents a line fit to VPP data ($VPP_{ch1}$) collected by the first RF sensor 117 for the first chamber 110. A line 558 represents a line fit to VPP data ($VPP_{ch2}$) collected by the second RF sensor 127 for the second chamber 120. A horizontal axis 554 represents a normalized line fit to data ($VPP_{spectra}$) collected by the golden reference sensor. Data of the gold reference sensor can serve as a calibration point for data collected by the first RF sensor 117 and the second RF sensor 127.

In a non-limiting embodiment, $VPP_{ch1}=a_{ch1}VPP_{spectra}+b_{ch1}$. $VPP_{ch2}=a_{ch2}VPP_{spectra}+b_{ch2}$. Herein, $a_{ch1}$ and $a_{ch2}$ are slopes while $b_{ch1}$ and $b_{ch2}$ are intercepts.

By some mathematical manipulation, $VPP_{ch2}=a_{ch2}/a_{ch1}(VPP_{ch1}-b_{ch1})+b_{ch2}=(a_{ch2}/a_{ch1})VPP_{ch1}-(a_{ch2}/a_{ch1})b_{ch1}+b_{ch2}$. That is, $VPP_{ch2}$ can be expressed in a linear relationship with $VPP_{ch2}$. As a result, $VPP_{ch2}$ for the second chamber 120 is now matched to $VPP_{ch1}$ for the first chamber 110, and both $VPP_{ch2}$ and $VPP_{ch1}$ are calibrated to the data for the golden reference sensor.

At step S240 in FIG. 2, current is calibrated, for example using a process 600 shown in FIG. 6. In block 601, VM models 603 are built for example using the process 300. As a result, a first VM model of $SR_1=a_1V_1+b_1I_1$ for the first chamber 110 and a second VM model of $SR_2=a_2V_2+b_2I_2$ for the second chamber 120 are obtained. Herein, $SR_1$ is a first sputter rate, $V_1$ is a first voltage, and $I_1$ is a first current for the first chamber 110. $SR_2$ is a second sputter rate, $V_2$ is a second voltage, and $I_2$ is a second current for the second chamber 120. $a_1$, $a_2$, $b_1$ and $b_2$ are coefficients. Particularly, $a_1$ and $a_2$ are slopes while $b_1$ and $b_2$ are intercepts.

In block 605, a current calibration algorithm can be executed to obtain an equation 607 of $I_2=[b_1I_1-(a_1-a_2)V]/b_2=(b_1/b_2)I_1-(a_1-a_2)V/b_2$. That is, $I_2$ can be expressed in a linear relationship with $I_1$. As a result, $I_2$ for the second chamber 120 is now matched to $I_1$ from the first chamber 110. When the first chamber 110 and the second chamber 120 are perfectly matched, $a_1=a_2$. Accordingly, $I_2=(b_1/b_2)I_1$.

In a non-limiting example of the current calibration algorithm, let $V_1=V_2\equiv V$. Slopes $a_1$ and $a_2$ are not necessarily equal, and $b_1$ and $b_2$ are not necessarily equal as plasmas between the first chamber 110 and the second chamber 120 are not yet matched. Since SR is a global variable as it can be obtained by an off-line or ex-situ metrology tool, let $SR_1=SR_2\equiv SR$. Therefore, the first VM model becomes $SR=a_1V+b_1I_1$ for the first chamber 110 while the second VM model becomes $SR=a_2V+b_2I_2$. By equating the two SR equations, the equation 607 of $I_2=[b_1I_1-(a_1-a_2)V]/b_2=(b_1/b_2)I_1-(a_1-a_2)V/b_2$ is obtained.

In block 611, base recipe settings are utilized where $V_1=V_2\equiv V_0$, meaning that the first chamber 110 and the second chamber 120 form plasmas at a same voltage on wafers. A control model 613, such as the control model 353, is provided. As a result, changes in I can be described as a function of changes in the recipe parameters, e.g. ΔI=g(Δ(recipe parameters)).

In block 615, the first voltage $V_1$ and the second voltage $V_2$ are set to a fixed value of $V_0$. The plasma recipe is executed in the first chamber 110 and the second chamber 120 with varying current (e.g. $I_1$ and $I_2$) while maintaining the first voltage $V_1$ and the second voltage $V_2$ at the fixed value of $V_0$. In some embodiments, changes in the recipe parameters Δ(recipe parameters), which are needed to vary the current (e.g. $I_1$ and $I_2$) while maintaining $V_1$ and $V_2$ at $V_0$, are determined based on the control model 613. The recipe parameters are then adjusted based on the changes, Δ(recipe parameters), which are determined.

Voltage and current (V-I) data 617 can be collected while executing the plasma recipe with the varying I. Corresponding sputter rate (SR) data can be obtained before and after executing the plasma recipe with the varying I. The V-I data 617 can be processed at least in part based on a linear or non-linear equation. In a non-limiting example of block 621, the V-I data 617 are fitted using the equation 607.

In some embodiments, the controller 130 may optionally be coupled to various components of the process 600 to receive inputs from and provide outputs to the components, similar to the process 300 in FIG. 3. The descriptions have been provided above and will be omitted herein for simplicity purposes.

Figure 7:
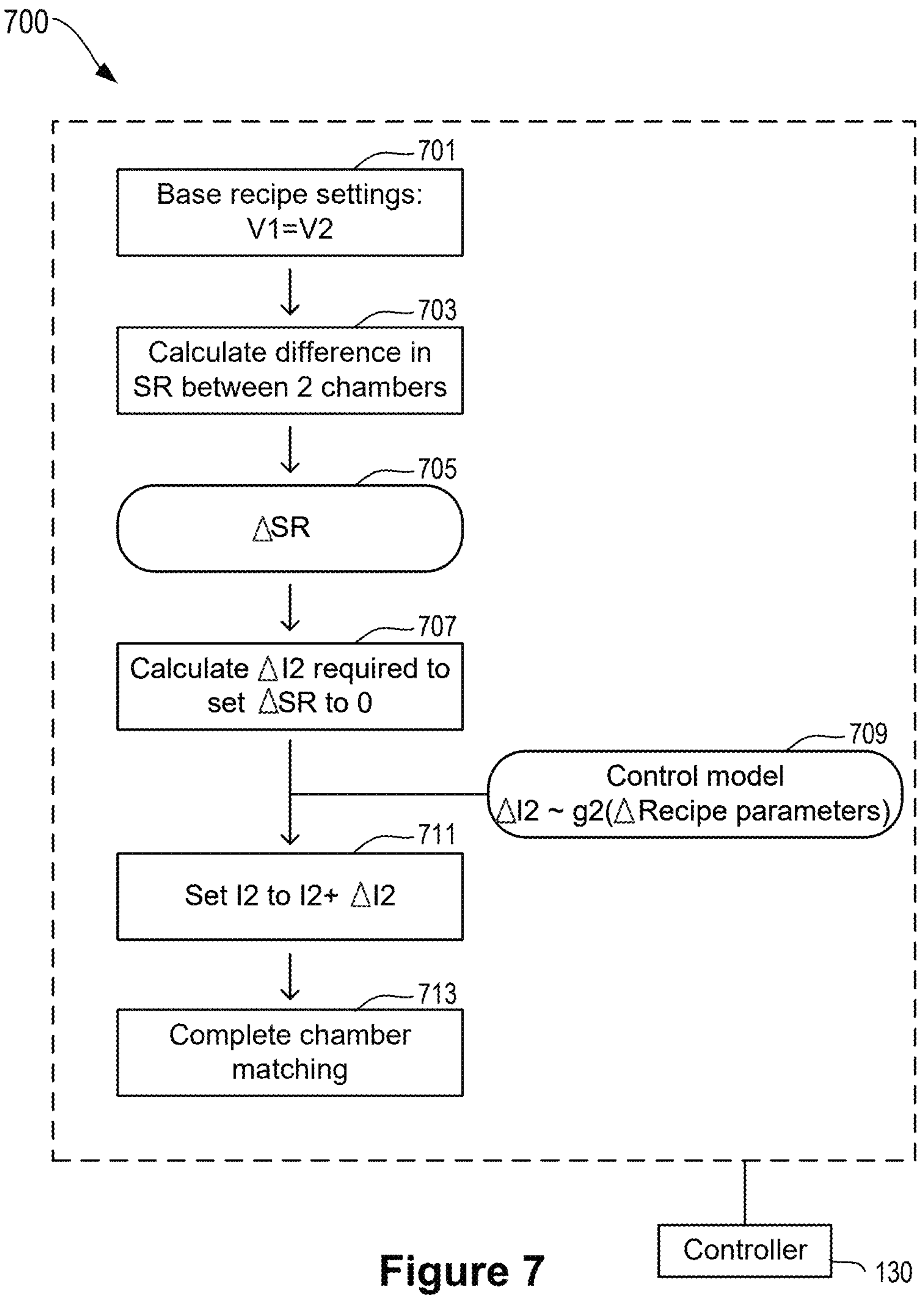
FIG. 7 shows a flow diagram of performance matching between processing chambers in accordance with one embodiment of the present disclosure.

FIG. 7 shows a flow diagram of a process 700 of performance matching between processing chambers in accordance with one embodiment of the present disclosure. In block 701, base recipe settings are utilized where $V_1=V_2\equiv V_0$, similar to block 611 in FIG. 6. A difference in sputter rate (SR) (ΔSR 705) between two chambers is calculated. For example, the first VM model of $SR_1=a_1V_1+b_1I_1$ and the second VM model of $SR_2=a_2V_2+b_2I_2$ can be leveraged. Particularly, $\Delta SR=SR_1-SR_2=a_1V_1+b_1I_1-(a_2V_2+b_2I_2)$. Since $V_1=V_2\equiv V_0$, therefore $\Delta SR=b_1I_1-b_2I_2+(a_1-a_2)V_0$.

In block 707, the equation of ΔSR above can be used to determine $\Delta I_2$ required to set ΔSR to zero (or $0{*}SR_1$, or $0{*}SR_2$). For instance, $b_1$, $b_2$, $a_1$, $a_2$ and $V_0$ are constants. $I_1$ can also be treated as a constant so $I_2$ is the only variable in the equation above. When ΔSR=0, $I_2{*}$ can be solved for. Therefore, $\Delta I_2=I_2{*}-I_2$.

A control model 709, such as the control model 353, is provided. As a result, changes in $I_2$ can be described as a function of changes in the recipe parameters, e.g. $\Delta I_2=g_2(\Delta$ (recipe parameters)). Δ(recipe parameters) required for $\Delta I_2$ can then be obtained.

In block 711, $I_2$ is set to be $I_2=I_2+\Delta I_2$ by adjusting the recipe parameters by Δ(recipe parameters). As a result, chamber matching can be completed in 713. In other words, ΔSR is now equal to zero for the first chamber 110 and the second chamber 120.

In some embodiments, the controller 130 may optionally be coupled to various components of the process 700 to receive inputs from and provide outputs to the components, similar to the process 300 in FIG. 3. The descriptions have been provided above and will be omitted herein for simplicity purposes.

In the preceding description, a variable is often set to an exact value or expressed in an exact equation for illustrative purposes. It should be understood that variables can be set to ranges that include the identified values and equations within a margin of 10%, preferably 5%, preferably 3%, preferably 1% and any values therebetween. For example, while $V_1$ and $V_2$ are both set to $V_0$ for illustrative purposes, $V_1$ can be set to $V_0$ while $V_2$ set to $97\%{*}V_0$. While ΔSR is set to 0 (or $0{*}SR_1$, or $0{*}SR_2$) for illustrative purposes, ΔSR can also be set to $1\%{*}SR_1$, $5\%{*}SR_2$ and the like.

Referring back to FIG. 1, the first chamber 110 and the second chamber 120 are shown for illustrative purposes. It should be understood that the system 100 can include any number of plasma processing chambers which can be part of a single plasma processing tool or belong to multiple plasma processing tools. Accordingly, a plurality of chambers can be matched using techniques herein. For example when there are N chambers, one chamber can be chosen as a reference chamber, and the remaining (N−1) chambers can each be matched to the reference chamber using the processes 200 and 700. Alternatively, the Mth chamber can be matched to an average of the first, second . . . (M−2)th and (M−1)th chambers, where M is an integer from 2 to N.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "wafer" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

The substrate can be any suitable substrate, such as a silicon (Si) substrate, a germanium (Ge) substrate, a silicon-germanium (SiGe) substrate, and/or a silicon-on-insulator (SOI) substrate. The substrate may include a semiconductor material, for example, a Group IV semiconductor, a Group III-V compound semiconductor, or a Group II-VI oxide semiconductor. The Group IV semiconductor may include Si, Ge, or SiGe. The substrate may be a bulk wafer or an epitaxial layer.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A method of chamber matching, comprising:

providing a first virtual metrology (VM) model that is configured to predict a first thickness change rate (TCR) for executing a plasma recipe in a first chamber, and a second VM model that is configured to predict a second TCR for executing the plasma recipe in a second chamber, wherein the plasma recipe comprises one or more inert gases and no reactive gases;

providing a control model that describes relationships between voltage, current and recipe parameters;

calibrating, in reference to a first voltage in the first chamber measured by a first radio frequency (RF) sensor, a second voltage in the second chamber measured by a second RF sensor, using a golden reference sensor; and calibrating, in reference to a first current in the first chamber measured by the first RF sensor, a second current in the second chamber measured by the second RF sensor, using the first TCR, the second TCR, the first VM model, the second VM model and the control model.

2. The method of claim 1, further comprising:

setting the first voltage and the second voltage to a fixed value;

executing the plasma recipe in the first chamber and the second chamber with varying current while maintaining the first voltage and the second voltage at the fixed value; and collecting TCR data and voltage and current (V-I) data for the varying current.

3. The method of claim 2, further comprising: determining, based on the control model, changes in the recipe parameters needed to vary the current while maintaining the first voltage and the second voltage at the fixed value; and adjusting the recipe parameters based on the changes determined.

4. The method of claim 3, further comprising: processing the V-I data at least in part based on a linear or non-linear equation.

5. The method of claim 4, further comprising: obtaining a linear equation of the second current versus the first current using the first TCR, the second TCR, the first VM model and the second VM model; and fitting the V-I data with the linear equation.

6. The method of claim 5, wherein: the linear equation has a slope of zero.

7. The method of claim 1, further comprising: setting the first voltage equal to the second voltage; determining a difference between the first TCR and the second TCR; and adjusting the second current based on the control model, while maintaining the first voltage equal to the second voltage, so that the first TCR and the second TCR are substantially the same.

8. The method of claim 7, further comprising: determining, based on the control model, changes in the recipe parameters needed to substantially offset the difference between the first TCR and the second TCR by varying the second current while maintaining the first voltage equal to the second voltage; and adjusting the recipe parameters based on the changes determined.

9. The method of claim 7, further comprising: calculating the difference between the first TCR and the second TCR based on the second voltage calibrated, the second current calibrated, the first VM model and the second VM model.

10. The method of claim 1, wherein: the first TCR and the second TCR are both etch rates or both sputter rates.

11. The method of claim 10, wherein: the first TCR and the second TCR are sputter rates on blanket films.

12. The method of claim 1, wherein: the plasma recipe comprises a plasma etching recipe.

13. The method of claim 1, wherein: the first RF sensor and the second RF sensor comprise voltage peak-to-peak (VPP) sensors.

14. The method of claim 13, wherein the first voltage and the second voltage are each an on-wafer voltage at a respective wafer surface.

15. The method of claim 1, further comprising: executing the plasma recipe in the first chamber and the second chamber; measuring voltage and current (V-I) data with the first RF sensor and the second RF sensor while executing the plasma recipe; and measuring TCR data before and after executing the plasma recipe.

16. The method of claim 15, further comprising: building the first VM model and the second VM model using the V-I data and the TCR data.

17. The method of claim 15, further comprising: determining the recipe parameters using design of experiment (DOE); and building the control model using the V-I data, the TCR data and the recipe parameters.

18. The method of claim 1, wherein calibrating the second voltage comprises: forming a baseline plasma in the first chamber at least in part based on one or more baseline process conditions implemented by the first chamber; determining a baseline signature of the baseline plasma using the golden reference sensor disposed within the first chamber and one or more baseline plasma sensors monitoring the baseline plasma; forming plasma in a second chamber at least in part based on the baseline process conditions used to form the baseline plasma; determining a signature of the plasma using the golden reference sensor disposed within the second chamber and one or more plasma sensors monitoring the plasma; determining differences between the baseline signature and the signature at least in part based on linear or non-linear equations that are representative of the baseline signature and the signature; and adjusting a display value of the second voltage at least in part based on the differences between the baseline signature and the signature, to compensate for the differences to provide voltage matching between the second chamber and the first chamber.

19. The method of claim 18, wherein: the golden reference sensor comprises a plasma voltage sensor.

20. An apparatus, comprising:
a controller including a processor that is programmed to:
providing a first virtual metrology (VM) model that is configured to predict a first thickness change rate (TCR) for executing a plasma recipe in a first chamber, and a second VM model that is configured to predict a second TCR for executing the plasma recipe in a second chamber, wherein the plasma recipe comprises one or more inert gases and no reactive gases;
providing a control model that describes relationships between voltage, current and recipe parameters;
calibrating, in reference to a first voltage in the first chamber measured by a first radio frequency (RF) sensor, a second voltage in the second chamber measured by a second RF sensor, using a golden reference sensor; and
calibrating, in reference to a first current in the first chamber measured by the first RF sensor, a second current in the second chamber measured by the second RF sensor, using the first TCR, the second TCR, the first VM model, the second VM model and the control model.

* * * * *